United States Patent
Stöcklein et al.

(10) Patent No.: US 6,278,828 B1
(45) Date of Patent: Aug. 21, 2001

(54) OPTICAL TRANSMISSION ELEMENT AND METHOD FOR REDUCING POLARIZATION-MODE DISPERSION THEREOF

(75) Inventors: Waldemar Stöcklein, Coburg; Winfried Rutzen, Dörfles-Esbach, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/660,275

(22) Filed: Sep. 12, 2000

Related U.S. Application Data

(63) Continuation of application No. PCT/DE98/03735, filed on Mar. 12, 1998.

(30) Foreign Application Priority Data

Mar. 12, 1998 (DE) .............................. 198 10 812

(51) Int. Cl.$^7$ ................................................ G02B 6/00
(52) U.S. Cl. ................................... 385/123; 385/11
(58) Field of Search .................. 385/11, 100, 109–114, 385/123, 128

(56) References Cited

U.S. PATENT DOCUMENTS

| | | | | |
|---|---|---|---|---|
| 4,480,897 | * | 11/1984 | Okamoto et al. | 385/11 |
| 5,042,907 | * | 8/1991 | Bell et al. | 385/123 |
| 5,298,047 | * | 3/1994 | Hart, Jr. et al. | 65/432 |
| 5,440,659 | * | 8/1995 | Bergano et al. | 385/100 |
| 5,613,028 | * | 3/1997 | Antos et al. | 385/123 |
| 5,822,487 | * | 10/1998 | Evans et al. | 385/123 |
| 5,867,616 | * | 2/1999 | Antos et al. | 385/11 |
| 5,943,466 | * | 8/1999 | Henderson et al. | 385/123 |

FOREIGN PATENT DOCUMENTS

WO 96/23739 * 8/1996 (WO).

* cited by examiner

Primary Examiner—Rodney Bovernick
Assistant Examiner—Sarah N Song
(74) Attorney, Agent, or Firm—Alston & Bird LLP

(57) ABSTRACT

In order to reduce the polarization-mode dispersion, disturbance mechanisms are provided along the length of the respective optical waveguide in a statistically distributed manner. The disturbance mechanisms bring about additional polarization-mode couplings for transmission light in the optical waveguide interior.

25 Claims, 6 Drawing Sheets

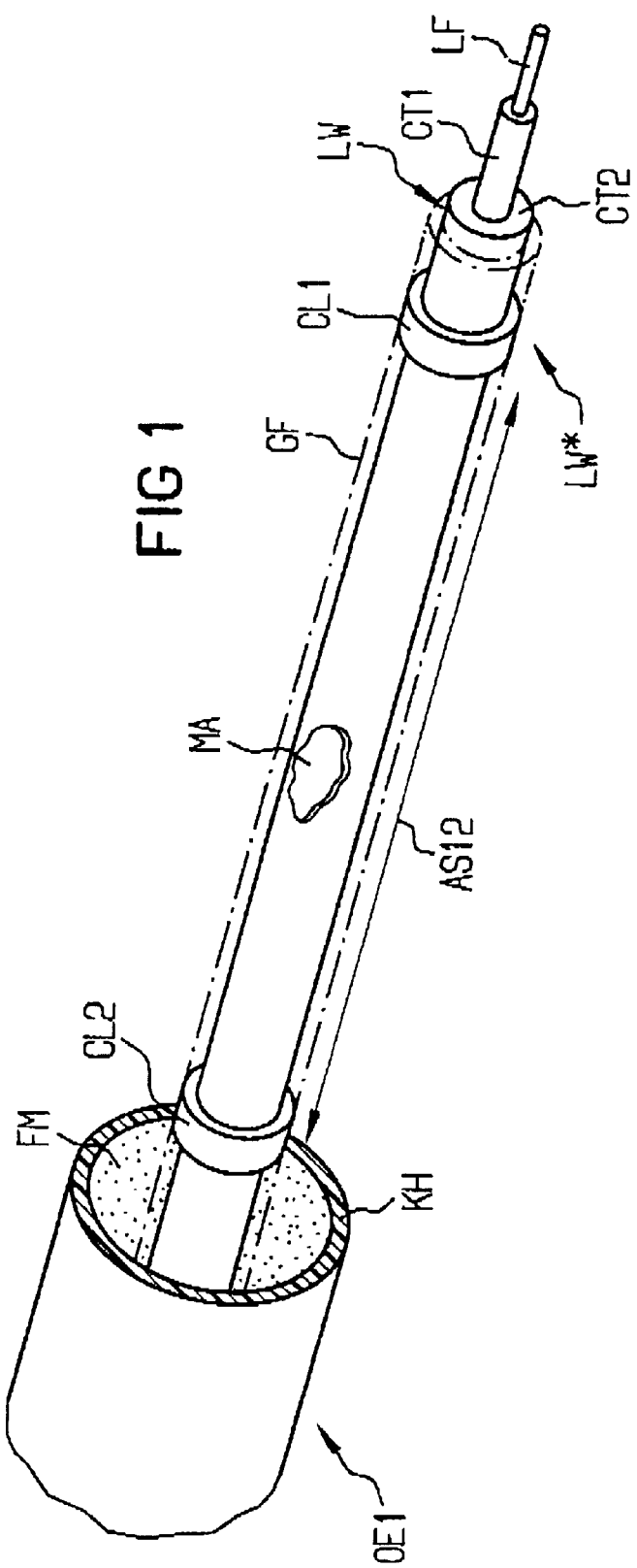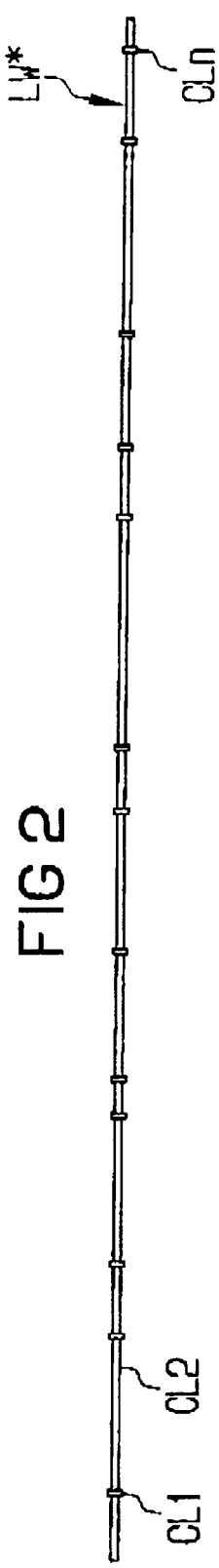

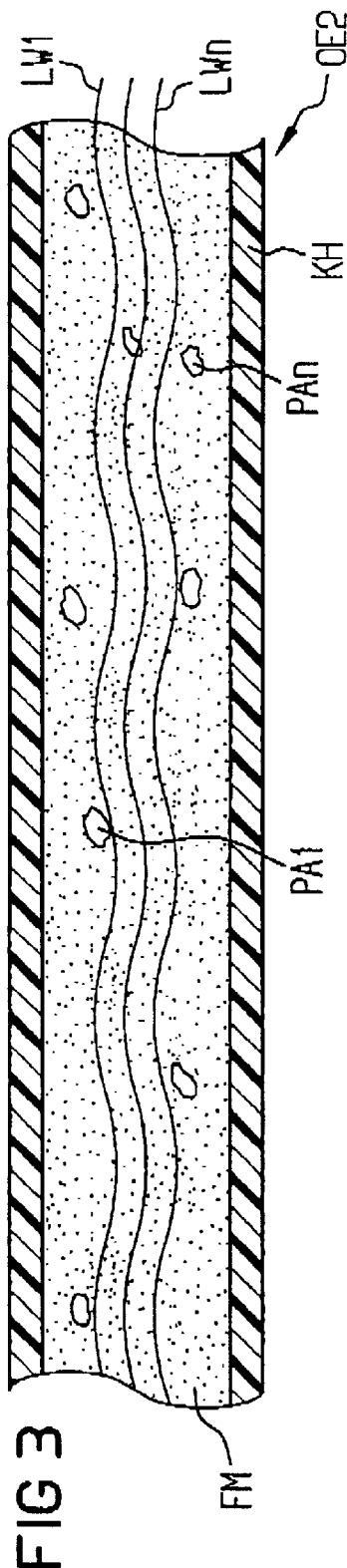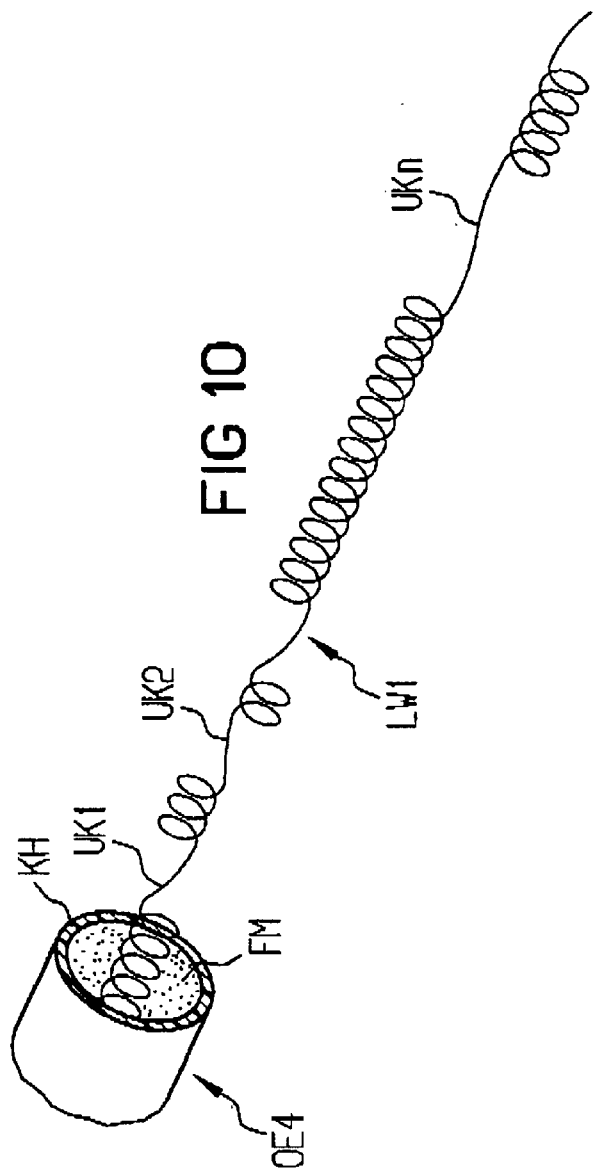

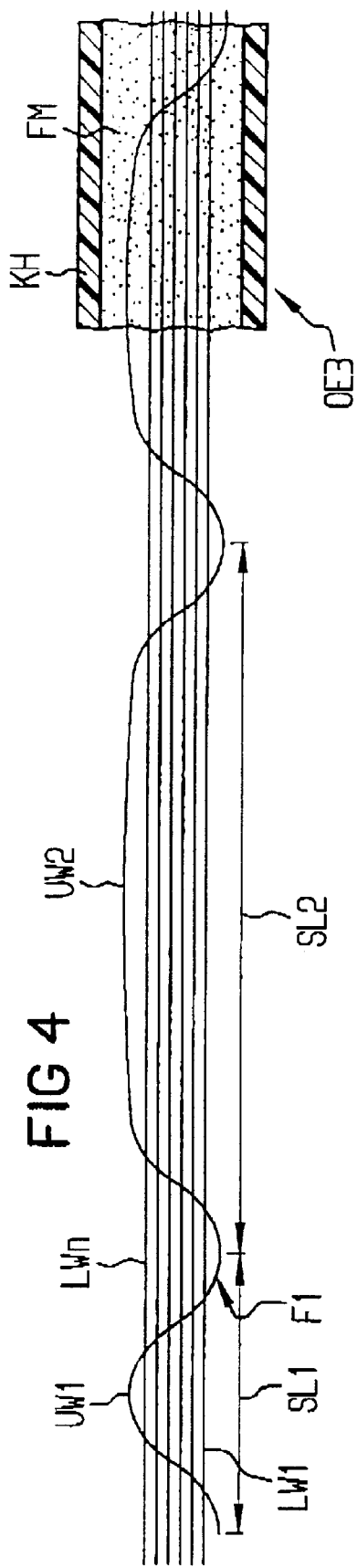
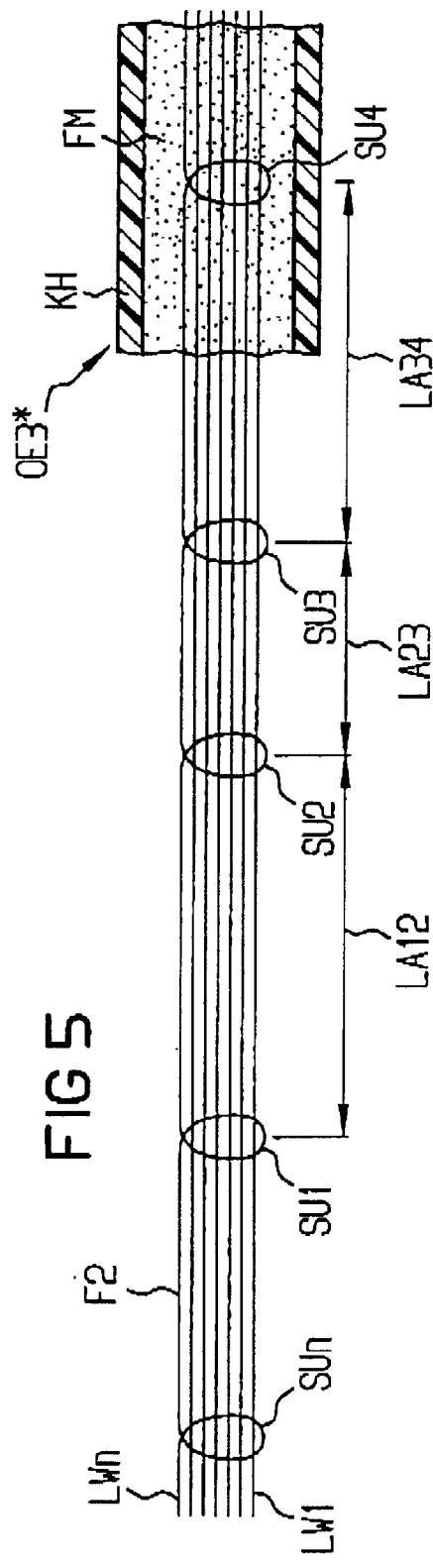

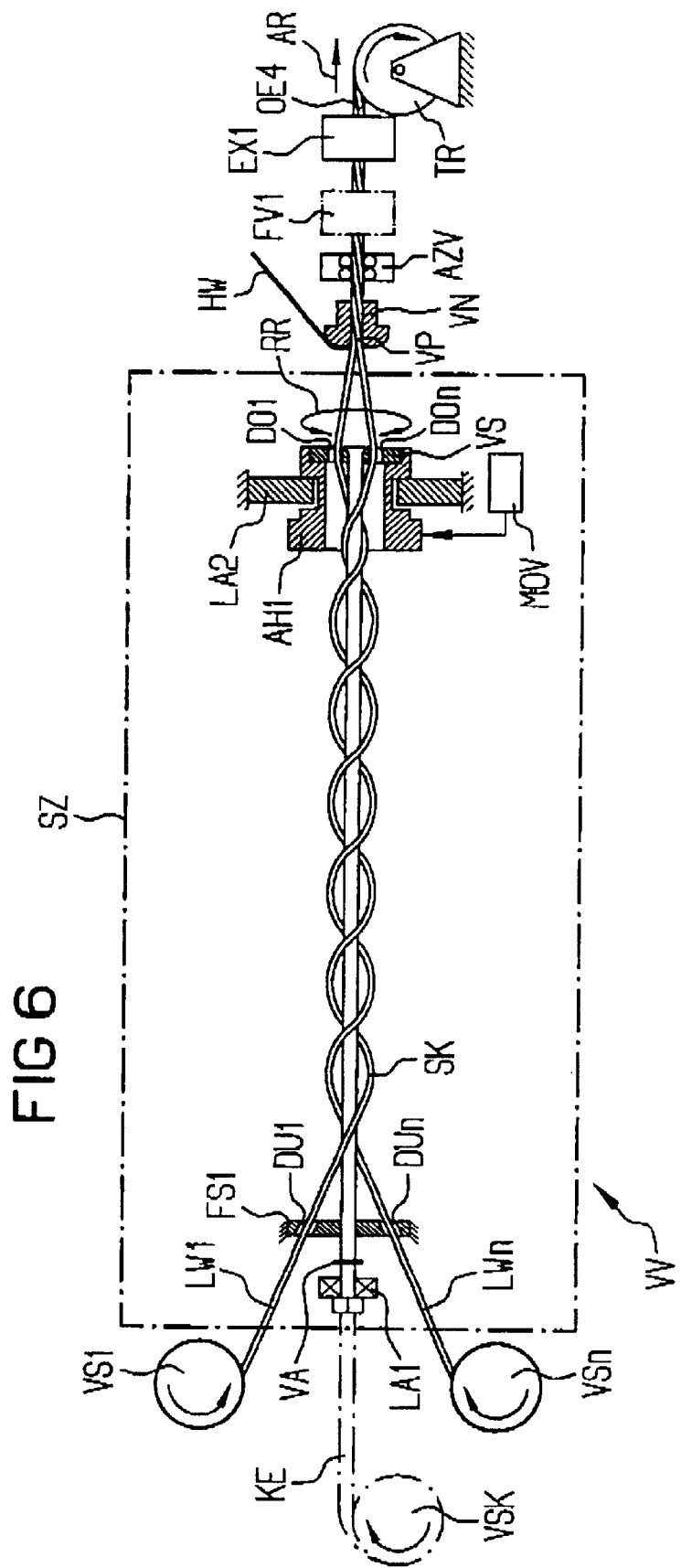

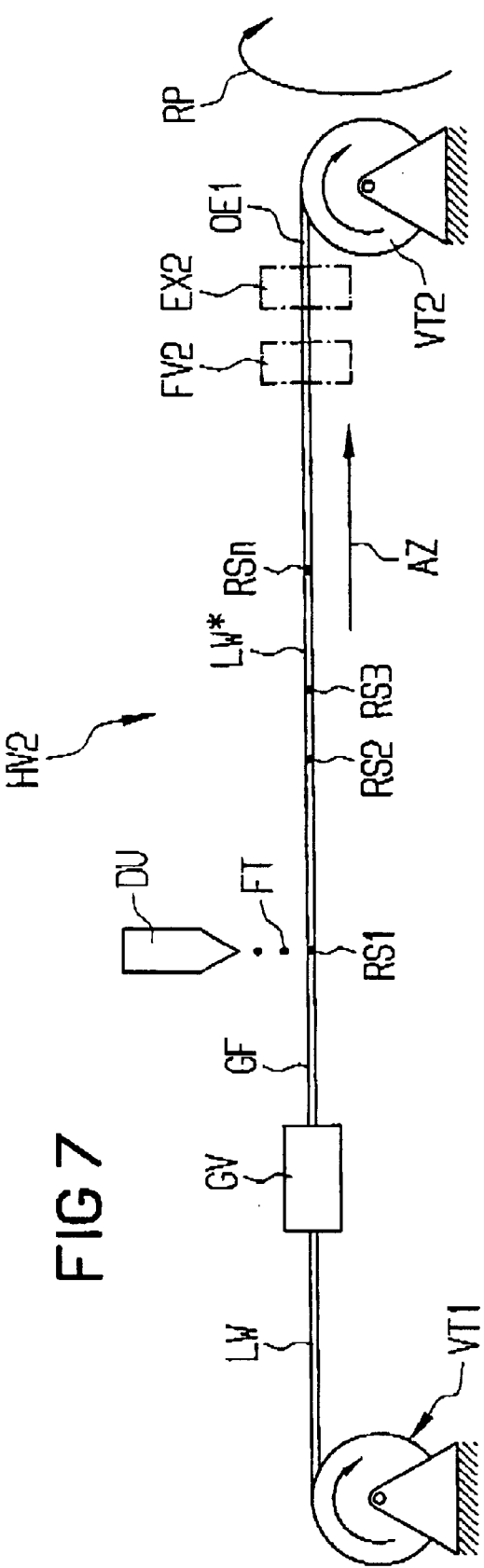

OPTICAL TRANSMISSION ELEMENT AND METHOD FOR REDUCING POLARIZATION-MODE DISPERSION THEREOF

CROSS-REFERENCE TO RELATED APPLICATION

This is a continuation of copending International Application PCT/DE98/03735, filed Mar. 12, 1998, which designated the United States.

BACKGROUND OF THE INVENTION

Field of the Invention

The invention relates to an optical transmission element having at least one optical waveguide which comprises a given polarization-mode dispersion.

In practice, it can occur that some of the optical waveguides in optical transmission elements comprise an impermissibly high dispersion. As a result, in such optical waveguides their bandwidth for communication transmission can be too strictly limited. Particularly when what is known as a monomode fiber is utilized for the respective optical waveguide, its polarization-mode dispersion—that is, the transit time difference between its light waves, or modes, respectively, that are capable of dispersion (=natural waves)—can exceed an allowed limit value. This would lead to an impermissibly high impulse distribution of light signals that are to be transmitted in the respective optical waveguide.

U.S. Pat. No. 5,867,616 (see International PCT publication WO 97/06456) describes an optical waveguide in which, in order to reduce polarization-mode dispersion, imperfections—that is to say, birefringences-in the form of trenches are introduced into a preform of the optical waveguide during production.

International PCT publication WO 96/23739 teaches a method for producing an optical fiber. Manipulations are performed on the fiber by irradiation during the production process—that is to say, during the process of producing the preform from which the fibers are drawn.

U.S. Pat. No. 5,440,659 (see European published patent application EP 0 646 819 A1 teaches a method for producing a fiber-optic cable wherein a plurality of optical fibers are stranded together so as to effectuate a reduction of the polarization-mode dispersion.

SUMMARY OF THE INVENTION

The object of the invention is to provide an optical waveguide in transmission elements which overcomes the above-noted deficiencies and disadvantages of the prior art devices and methods of this kind, and wherein impermissibly high polarization-mode dispersion is reliably prevented to a large extent subsequent to the production thereof.

With the above and other objects in view there is provided, in accordance with the invention, an optical transmission element, comprising:

an optical waveguide having a given polarization-mode dispersion;

at least one outer protective layer applied to and completely surrounding the optical waveguide; and a plurality of imperfections for reducing the given polarization-mode dispersion formed by additional material applications applied on an outer surface of the outer protective layer and distributed at irregular intervals along a length of the optical waveguide for purposefully effecting additional polarization-mode couplings for transmission light in an interior of the optical waveguide.

The term "optical waveguide" as used above includes one or more waveguides.

In accordance with an added feature of the invention, the material applications are color markings.

With the above and other objects in view there is also provided, in accordance with a variation of the invention, an optical transmission element, comprising:

an optical waveguide having a given polarization-mode dispersion;

at least one outer protective layer applied to and completely surrounding the optical waveguide; and filling compound embedding the optical waveguide, the filling compound containing particles distributed along the optical waveguide at irregular intervals and forming imperfections along the optical waveguide for reducing the given polarization-mode dispersion, for purposefully effecting additional polarization-mode couplings for transmission light in an interior of the optical waveguide.

In accordance with an additional feature of the invention, an elongated winding material is wrapped around the optical waveguide or waveguides, the winding material forming a disturbing mechanism for effecting additional imperfections and thus additional dispersion-mode couplings in the optical waveguide(s).

In accordance with another feature of the invention, the optical waveguide is twisted with an irregularly varying twist length for effecting additional imperfections. In the alternative, the optical waveguide is stranded with an irregularly varying twist length for effecting additional imperfections.

In accordance with a further feature of the invention, there is provided an outer sheath forming a tube surrounding the optical waveguide or the plurality of optical waveguides.

In accordance with again an additional feature of the invention, the optical waveguide is post-processed with a number of imperfections guaranteeing at least 0.001%, and in particular between 0.01 and 1%, more dispersion-mode couplings than the optical waveguide substantially without imperfections.

By providing additional disturbing mechanisms along the longitudinal extent of the respective optical waveguide in a statistically distributed manner—whereby the imperfections effectuate purposeful additional polarization-mode couplings for transmission light in the interior of the optical waveguide from the outside—it is possible to subsequently reduce the polarization-mode dispersion of the respective optical waveguide. Thus, even optical waveguides whose polarization-mode dispersion was impermissibly high—for whatever reasons—prior to the use thereof in the respective optical transmission element can be subsequently brought to within an acceptable upper limit value. When all optical waveguides that are provided for use are post-processed in this way, then it is preventively ensured to a large extent that all the optical waveguides which are ultimately included in the finished optical transmission element also comprise a sufficient bandwidth. Intensive polarization-mode dispersion measurements for sorting and separating out optical waveguides that may comprise an impermissibly high polarization-mode dispersion and thus do not satisfy quality standards for communication transmission are thus largely avoided.

In accordance with again an added feature of the invention, the optical waveguide is a monomode fiber. When such a monomode or single-mode fiber is used for the respective optical waveguide, the originally given polarization-mode dispersion can be retroactively reduced in a particularly effective manner with the aid of the novel post-processing according to the invention.

There is also provided, in accordance with the invention, an optical cable provided with at least one optical transmission element according to the above and following summary.

As noted above, the novel optical transmission element may comprise at least one optical waveguide with the described polarization-mode dispersion, wherein, for the subsequent reduction of the given polarization dispersion of the respective optical waveguide thereof, the respective optical transmission element is stranded with a statistically varying twist length around a core element, thereby subsequently producing disturbance mechanisms which purposefully externally effectuate additional polarization-mode couplings for transmission light in the interior of the optical waveguide.

The invention also relates to an optical waveguide having an optical fiber onto which at least one all-round external protective layer has been applied and which comprises a predetermined polarization-mode dispersion; which is wherein imperfections have been subsequently introduced onto the outer protective layer in a statistically distributed manner in such a way that additional polarization-mode couplings are purposefully effectuated for transmission light in the optical fiber, whereby the predetermined polarization-mode dispersion of the optical fiber can be subsequently reduced.

With the above and other objects in view there is also provided, in accordance with the invention, a method for reducing the polarization-mode dispersion of optical waveguides. In order to reduce the predetermined polarization-mode dispersion of the respective optical waveguide afterward, imperfections are subsequently created along its length from the outside and are statistically distributed so as to bring about additional polarization-mode couplings for transmission light in the interior of the optical waveguide.

Other features which are considered as characteristic for the invention are set forth in the appended claims.

Although the invention is illustrated and described herein as embodied in optical transmission element and method for reducing polarization-mode dispersion thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic enlarged perspective view of a first exemplary embodiment of an optical transmission element according to the invention;

FIG. 2 is a schematic side view of a longitudinal section of an optical waveguide of the optical transmission element as illustrated in FIG. 1, wherein additional polarization-mode couplings for transmission light in the interior of the optical waveguide are effectuated by dye applications;

FIGS. 3, 4 and 5 are schematic enlarged longitudinal section of three additional variations of an optical transmission element according to the invention;

FIG. 6 is a schematic overview of a device for producing a novel optical transmission element or optical cable;

FIG. 7 is a schematic of a possible production line for the optical transmission element shown in FIG. 1;

FIG. 10 is a schematic enlarged perspective view of an additional exemplary embodiment of a novel optical transmission element.

Identical and functionally equivalent elements are identified with the same reference characters throughout the drawing figures.

DESCRIPTION OF THE PREFERRED EMBODIMENTS

Figure 8:
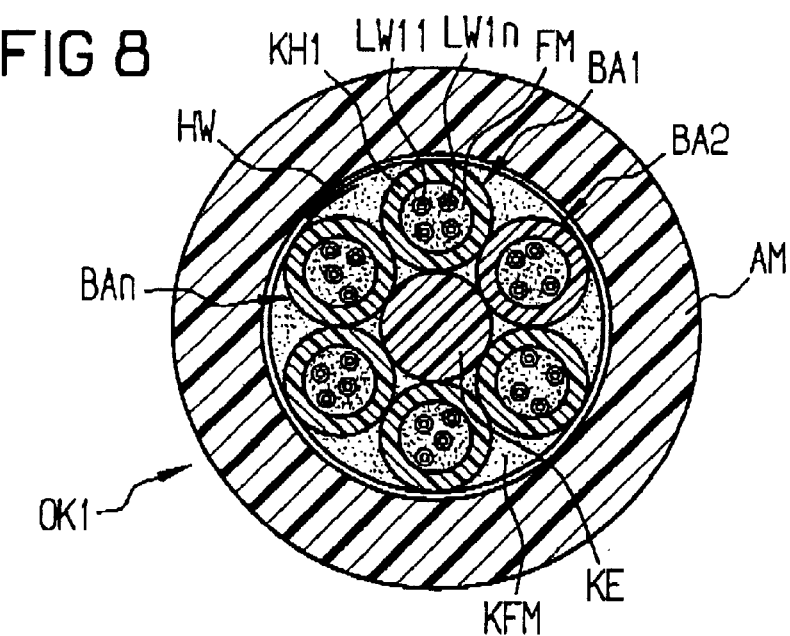
FIG. 8 is a schematic enlarged cross-sectional view of an exemplary embodiment of a novel optical cable which can be produced with the aid of the device shown in FIG. 6, for example.

Referring now to the figures of the drawing in detail and first, particularly, to FIG. 1 thereof, there is seen an enlarged schematic perspective view of a partial section of a first optical transmission element OE1 according to the invention. This optical transmission element OE1 is shown with its covering removed in layers for the sake of providing a better overview of its structure. Inside its outer sheath KH, it comprises at least one optical waveguide; that is, a single waveguide or a plurality thereof. For the sake of simplifying the drawing, in FIG. 1 only one individual optical waveguide LW* is surrounded by the outer sheath KH. The optical waveguide LW* is disposed in the outer sheath KH preferably with play on all sides; that is, it can be moved freely. The outer sheath KH surrounds the optical waveguide LW* loosely in the manner of a tube. In particular, the optical waveguide LW* is accommodated in the outer sheath KH with overhang. The outer sheath KH is fashioned essentially as a cylinder in FIG. 1. A flexible plastic material such as polycarbonate (PC), polybutylene terephthalate (PBT), polycarbonate/polypropylene, polypropylene, PC/PBT or polyetherimide/PBT is preferably used for this, either singly or in a combination of materials.

Specifically, it can be constructed in one or more layers. It can be advantageously produced by the extrusion of plastic material.

The optical waveguide LW* is expediently embedded in a soft filling compound FM in the hollow interior of the outer sheath KH. This filling compound advantageously has a somewhat paste-like consistency that allows the optical waveguide certain compensating or movement processes. In particular, it is also possible to use thixotropized filling compounds in order to be able to provide the respective optical waveguide with a barrier against OH-group diffusion; that is, to provide a steam barrier. It may also be expedient to provide filling compounds containing oil or fat for this purpose. In this way, the optical transmission element OE1 can also be made watertight longitudinally to a large extent. In addition, the filling mass FM advantageously also assumes a cushioning function for the respective optical waveguide. It may also be possible to provide a very soft cushioning layer as filler, for instance a heavily foamed highly elastic plastic. Expediently, the filling mass FM and the optical waveguide that is embedded therein are tightly surrounded by the outer sheath FH without joints.

In its interior, the optical waveguide LW* comprises an optical fiber LF, which is completely covered outside by at least one layer of plastic for protection. In FIG. 1 the optical fiber LF is covered by a first layer of plastic CT1 (=primary coating) and thereover by a second, outer layer of plastic CT2 (=secondary coating). A resin is preferably used as coating material. The optical fiber is preferably shaped as a cylinder. Therupon sit the two coating layers CT1, CT2 in an essentially concentric manner as torus-like jackets. In this way, an optical waveguide LW with an approximately cylindrical shape is formed; that is, broadly stated, a waveguide with a homogenous outer contour. Optical waveguides are customarily delivered with this standard construction and employed in the production of optical transmitting elements or optical cables. For the respective optical waveguide such as LW in FIG. 1, what is known as a monomode or single mode fiber is used as optical fiber. In such a monomode fiber, transmission light is capable of dispersion in the longitudinal direction of the fiber primarily with the two submodes of its base mode. These two submodes have different oscillation planes which stand in an essentially orthogonal relation to one another.

In practice, it can happen that some of these optical waveguides which have been produced according to standard and which are used in optical transmission elements comprise an impermissibly high polarization-mode dispersion therein. In particular, if, for example, single-mode fibers are used for the utilized optical waveguides, then the polarization-mode dispersion of a particular percentage of these single-mode fibers can be increased impermissibly due to production fluctuations in the fiber drawing process, for example. This means that in some optical waveguides the transit time difference between the two dispersion-capable light waves—that is to say, submodes—($LP_{01x}$/$LP_{01y}$-natural waves) of transmission light can impermissibly exceed an upper limit value. But an excessively large polarization-mode dispersion would lead to an excessive limiting of the bandwidth in the affected optical waveguide.

An impermissibly high polarization-mode dispersion of a certain proportion of the optical waveguides that are to be situated in optical transmission elements can be caused by any number of practical circumstances. For instance, an impermissibly high polarization-mode dispersion can be caused by interference or influences in the interior of the glass material of the respective single-mode fiber, which effectuate birefringence for the transmission light therein. In this case, the effective group refractive indices for the two dispersion-capable submodes of the transmission light in subregions of the respective single-mode fiber can be so different from one another as to give rise to an impermissibly large transit time difference for the two submodes and thus an impermissibly large impulse broadening over the entire length of the fiber. Internal interference effects such as this which lead to a difference of the effective optical transit times for the different modes can be caused randomly during the fiber drawing process in particular. They can be attributable in particular to tensions in the glass material, asymmetries (or specifically unroundnesses), in the fiber's cross-sectional profile and/or by other anomalies in the glass structure of the respective optical fiber. Additionally or separately, different effective group refractive indices for the dispersion-capable modes of the transmission light in the respective optical fiber may also potentially be caused by external interference, for instance during the fiber dyeing or strip production processes. Such external interference effects can arise particularly when the optical fibers are being further processed. Furthermore, the polarization-mode dispersion of the respective single-mode fibers in the respective optical transmission element can be influenced in an uncontrolled manner by mode couplings that somehow set in therein, which effectuate an exchange of energy between the two dispersion-capable submodes of the transmission light.

What's more, practical experiments on optical cables have shown that despite the quality control measures already in existence, surprisingly approximately between 0.5 and 4% (preferably) of all single-mode fibers used can comprise an impermissibly high polarization-mode dispersion, namely of more than 0.5 ps/km½.

In order now to reliably prevent the optical waveguides of optical transmission elements from comprising impermissibly high polarization-mode dispersion in some cases, disturbance mechanisms are advantageously subsequently provided—namely, statistically distributed—at irregular length intervals along the longitudinal extent of each individual optical waveguide, which mechanisms purposefully effectuate additional polarization-mode couplings for transmission light in the optical waveguide interior from the outside. Thus, each individual optical waveguide is expediently post-processed in such a way that the number of polarization-mode couplings thereof for transmission light in the interior of the optical waveguide is elevated relative to the waveguide's original production or delivery condition. In this way, the originally given polarization-mode dispersion of each optical waveguide can be reduced subsequently—that is, later, after its actual production—in the finished optical transmission element. In particular, in single-mode fibers, by means of these statistically distributed disturbance mechanisms, the energy exchange between the two dispersion-capable submodes of the transmission light can be purposefully increased to such an extent that optimally no transit time differences, and thus no impulse broadenings for communication signals, emerge for the two submodes in the respective single-mode fiber.

Disturbance mechanisms such as this with which additional polarization-mode couplings can be purposefully induced for the respective optical waveguide can be advantageously formed by drops of dye, in particular colored markings, for example, which are additionally applied onto the respective optical waveguide externally and are distributed—and namely statistically—along the longitudinal extent thereof at irregular, that is, non-equidistant, length intervals. Color markings such as this are additionally deposited externally on the outer coating layer CT2 of the cylindrical optical waveguide LW of FIG. 1 along the longitudinal extent thereof at statistically varying—that is, irregular or non-equidistant—length intervals from one another. Of this plurality of dye deposits, only two neighboring color deposits CL1, CL2, which follow each other at a length interval of AS12, are visible in FIG. 1 along the exposed subportion of the optical waveguide LW. By contrast, FIG. 2 shows a schematic side view of the optical waveguide LW along a greater exposed length of the optical transmission element OE1, in order to better illustrate that the color deposits follow one another at irregular length intervals. The plurality of color deposits are referenced CL1 with CLn in FIG. 2. Each individual color deposit is indicated there by a vertical slash along the length of the optical waveguide LW. The optical waveguide that has been provided with the color deposits—that is, the post-processed waveguide—is referenced LW* in FIGS. 1 with 2. The color markings CL1 to CLn extend approximately annularly around the outer perimeter of the optical waveguide LW. Each color marking CL1 with CLn forms an application layer at a local location in the length of the optical waveguide LW, which layer protrudes somewhat outward radially relative to the remaining cylindrical outer sheath of the optical waveguide LW. The respective color marking preferably comprises an application thickness of between 0.5 and 3.0 $\mu$m, in particular between 1 and 2$\mu$m. The width of the ring marks CL1 with CLn as viewed in the direction of the length of the fiber is preferably selected to be between 1 with 10 mm, and particularly between 2 and 5 mm. The longitudinal spacing distance between two consecutive color markings, or specifically ring marks, is expediently at least 25 mm, and particularly between 25 mm and 20 m. The random distribution of the length intervals of the color markings preferably corresponds to a uniform distribution. UV or PVC colors can preferably be used for the color markings. Expediently, it is also possible to intercalate the color markings CL1 with CLn into a base color, with which the optical waveguide LW is coated all around over its length, optimally with a constant thickness of application. In FIG. 1, this cylindrical sheath of the base color which additionally covers the waveguide LW is drawn in dotted lines and referenced GF. The color markings CL1 with CLn are preferably deposited thereon in the wet, still unhardened condition of the base color GF and are thereby largely integrated thereinto. This ensures a largely homogenous, essentially cylindrical outer contour of the post-processed optical waveguide LW*. Nevertheless, the drops of color CL1 with CLn which are subsequently deposited on the base color GF act as inhomogeneities in the base color. Specifically, they bring about local material tensions and thus microbends of the optical fiber LF so as to cause desirable additional dispersion-mode couplings in the optical fiber. Expediently, the same color pigment can be used for the color markings CL1 with CLn as for the base color GF. The color markings CL1 with CLn may also be realized transparent; that is, colorless.

Instead of ring marks, other forms of color markings may also be appropriate. In particular, the color markings can also cover only part of the outer perimeter of the optical fiber LW. In FIG. 1 this type of color marking of irregular shape which is deposited only on part of the outer perimeter of the optical waveguide LW is also illustrated in dotted lines and is referenced MA. With color markings such as these it may be expedient to vary their circumferential position from marking to marking, likewise statistically, i.e. irregularly, in the longitudinal direction of the fiber.

Instead of color markings, other material applications may also be expedient in order to generate microbends of the optical fiber LF mechanically from the outside, and so to generate polarization-mode couplings in the interior thereof. The following materials are suitable for such material applications: Herkula 810 (813) LTS by DS11 (registered trademark).

In particular, it may be expedient to use materials which can be processed in liquid form and which harden subsequent to application on the optical waveguide and adhere thereto. For the material applications that are statistically distributed in the longitudinal and/or circumferential directions, glues or melting adhesives may be suitable.

The statistically distributed additional material applications, such as MA on the optical waveguide LW, may be fashioned approximately as drops.

The length intervals of the material applications are expediently selected large enough to achieve the desired polarization-mode dispersion reduction while minimizing transmission loss.

Because the homogenous, in particular cylindrical, outer contour of the respective optical waveguide is additionally covered with statistically distributed material applications, imperfections are brought about locally for the optical fibers of the optical waveguide, which imperfections cause polarization-mode dispersion couplings for passing transmission light thereat. In this way, the original polarization-mode dispersion of the respective optical waveguide can be subsequently reduced. Even optical waveguides whose polarization-mode dispersion was—for whatever reason— impermissibly high prior to their use in the optical transmission element can be brought within an upper acceptable limit value by this post-processing measure. If all optical waveguides of the respective optical transmission element are post-processed in this way, then it is preventively ensured to a large extent that all optical waveguides which are situated in the finished optical transmission element also comprise a sufficient bandwidth. Intensive polarization-mode dispersion measurements for sorting or separating out optical waveguides with impermissibly high polarization-mode dispersion are thereby largely avoided. In this way, high quality standards with respect to the polarization-mode dispersion of optical waveguides in optical transmission elements can be maintained in a simple manner. Of course, these types of color applications, in particular ring markings, which are subsequently deposited and longitudinally randomly distributed can also serve as a distinctive attribute of the respective optical waveguide compared to others, for instance in a fiber bundle.

In addition to or independently of the material applications that are applied directly on the respective optical waveguide in a statistically distributed manner, it may also be expedient to mix additional particles into the filling compound FM of the optical transmission element as mechanical disturbance mechanisms. FIG. 3 shows such a modified optical transmission element OE2 in a schematic enlarged longitudinal section. In the hollow interior of its core covering KH, namely its outer plastic jacket, this optical transmission element OE2 comprises a plurality of optical waveguides LW1 with LWn, which are installed there with overhang relative to the length of the core covering KH. Compared to the straight core covering KH, the optical waveguides LW1 with LWn extend in a corrugated manner. In particular, they can be accommodated in the core covering along the center axis thereof in a helix or spiral shape. The disturbing particles PA1 with PAn are statistically distributed in the filling compound FM; that is, they are disposed in the hollow interior of the outer sheath KH at irregular intervals both in the longitudinal direction and in the circumferential direction. The density of the disturbing particles PAl with PAn is preferably selected to be different from the density of the filling compound FM. The disturbing particles can advantageously be formed by hollow spheres or air bubbles in the filling compound FM. For microspheres, acrylamide is an appropriate material, for example. A diameter of between 10 and 50 $\mu$m is preferably selected for the disturbing particles PA1 with PAn. The statistical distribution of the disturbing particles preferably corresponds to an essentially uniform distribution. A standard filling compound based on polyalphaolefines is an appropriate filling compound. The disturbing particles preferably comprise a share of at the most 5% by volume, and particularly between 0.5 and 2%, of the total weight of the filling compound FM.

The disturbing particles PA1 with PAn which are statistically distributed in the filling compound FM represent points of local inhomogeneity for the optical waveguides LW1 with LWn. They exert local pressure on the optical waveguides LW1 with LWn and thereby cause microbends of the optical waveguides. These microbends of the optical waveguides generate additional dispersion-mode couplings for transmission light in the optical waveguide interior. By correspondingly increasing the number of dispersion-mode couplings in the respective optical waveguide, its originally given polarization-mode dispersion can be reduced.

In the scope of the invention, the term dispersion refers to the combination of different effects which respectively lead to transit time differences, and thus to impulse broadenings as well as to reductions of the transmission bandwidth of the various dispersion-capable polarization modes in the respective optical waveguides. By providing local mechanical imperfections along the respective optical waveguide at irregular length intervals—i.e. in a statistically-distributed manner—it is possible to increase the number of dispersion-mode couplings in this optical waveguide. Due to the enhanced energy exchange between the dispersion-capable polarization modes in the respective optical waveguide, the originally different optical transit times for the different dispersion-capable polarization modes of the transmission light are equalized, and thus the polarization-mode dispersion is reduced. In other words, as a general rule, the transit time differences between the different dispersion-capable modes of the transmission light become smaller the more mode couplings are subsequently purposefully effectuated. The mode couplings can be purposefully triggered by providing local mechanical imperfections along the length of the respective optical fiber. These mechanical imperfections can be effectuated by microbends of the optical fibers, pressure on the optical fiber, or torsion of the optical fiber, for example. Since the dispersion effects are brought about by irregular—i.e. statistically distributed—interference effects, it is expedient to dispose the imperfections which are subsequently purposefully induced in a statistically distributed manner along the respective optical fiber. A random distribution, particularly a uniform distribution, of the imperfections that are subsequently purposefully provided is preferred, because the form of distribution (regular to random) of the causes of elevated polarization-mode dispersion usually cannot be decisively stated. The statistical distribution guarantees that positions at which an exchange of energy can occur between the polarization modes are hit sufficiently frequently. What results therefrom is a kind of mixing of different optical paths of these different dispersion-capable modes.

FIG. 4 shows a schematic enlarged longitudinal section of another optical transmission element OE3, which has been modified from the optical transmission element OE1 in FIG. 1. Here, a plurality of optical waveguides LW1 with LWn are wound helically with the aid of at least one elongated winding material. Said elongated winding material can be formed by a thread, twine, a strip-shaped helix, or the like, for example. In FIG. 4 the bundle of optical waveguides LW1 with LWn is wound by only one individual thread F1 in Lang's lay—that is, in the same direction of rotation, respectively. The twist (or lay) length of this thread F1 varies statistically, i.e. irregularly, from one spiral revolution to the next (as viewed along the length of the optical fiber bundle). Twist length refers to the longitudinal distance in the longitudinal direction of the bundle which the thread F1 covers with each 360° revolution about the bundle. The leads of these consecutive spiral revolutions of the thread F1 along the length of the bundle thus vary statistically. This is represented in FIG. 4 in that the spiral winding UW1 of the thread F1 having the pitch SL1 is followed by the spiral winding UW2 having a significantly larger pitch SL2. What the uneven distribution of the twist, or rather the pitch, of the windings accomplishes is that the optical waveguides LW1 with LWn are pressured in a statistically distributed manner—that is, irregularly—and thus microbends of the optical waveguides are brought about in a statistically distributed manner.

The twist length—that is to say, the lead—of the windings by the thread is expediently varied between 50 mm and 300 mm. The statistical distribution of the loop intervals advantageously corresponds to a uniform distribution. Preferably, the thread tension is selected between 0.5 and 4 N. A polyester thread is a suitable winding thread. For this polyester thread an outer diameter of approximately 0.1 mm is preferably selected.

Besides the helical winding of a bundle by a plurality of optical waveguides, it may of course also be expedient to wind each individual optical waveguide with at least one winding material individually in a corresponding manner.

FIG. 5 shows a schematic enlarged view of an optical transmission element OE3* that has been modified from FIG. 4. The bundle of optical waveguides LW1 with LWn is now wrapped by a thread F2 which extends along subportions of varying length approximately parallel to the optical waveguides of the bundle and wraps around the bundle in rings between every two consecutive parallel longitudinal portions. The thread F2 thus comprises 360° loops SU1 with SUn which are statistically distributed along the length of the bundle, while between the loops it runs essentially parallel to the optical waveguide bundle. The loops, or mesh, SU1 with SUn, surround the optical waveguide bundle in an approximately annular manner; that is, the bundle penetrates the virtual face of the respective loop approximately as a surface normal. The statistical variation of the loop intervals along the length of the optical waveguide bundle is shown in FIG. 5 in a simplified representation with four consecutive individual loops SU1 with SU4 of the thread F2 along the length of the bundle. The loop intervals LA12, LA23 and LA34 are different from one another; that is, they have been selected to be irregular.

Preferably, the twist length of the winding or the loop interval, respectively, is varied between 50 and 300 mm. For this purpose, a thread tension of approximately 1 N is expediently selected. The non-equidistant, in particular random distribution of the loop intervals is preferably selected corresponding to a uniform distribution.

In the scope of the invention, the term optical transmission element encompasses arbitrary structures, configurations, cross-sectional shapes and/or built-on accessories of optical waveguides which can be used as subunits in optical cables, communication cables, or cables of some other kind.

FIG. 6 shows a schematic plan view of a device VV for manufacturing a further inventive optical transmission element OE4. The manufacturing device VV comprises an SZ-stranding mechanism SZ for this purpose. A plurality of optical waveguides LW1 with LWn are fed thereto at the input side, these being drawn from an appertaining supply reels VS1 with VSn. The supply reels VS1 with VSn are preferably disposed in a stationary manner concentrically about the stranding axis VA of the stranding mechanism SZ. The essential component of the stranding mechanism SZ is an elongated storage body SK, which is suspended such that it rotates about its center stranding axis VA. In addition, FIG. 6 exemplarily shows a stationary bearing LA1, LA2 disposed at the ends of the storage body SK at the input side and at the output side, respectively. In order to be able to arrange the optical waveguides LW1 with LWn in a definite manner at the outer perimeter of the storage body SK in the region of its input-side end, a stationary feed device FS1 is externally provided around the storage body SK. It is thus possible to distribute the optical waveguides LW1 with LWn concentrically about the outer perimeter of the storage body SK. The feed device FS1 is preferably constructed as a feed disk or a distributor disk, respectively. The storage body SK is guided through the central through-opening of this stationary distributor disk in a freely rotating manner. The distributor disk is preferably constructed similarly to an apertured disk. Each optical waveguide LW1 with LWn is led through an allocated borehole—that is to say, a through-opening DU1 with Dun—of the distributor disk FS1 in the longitudinal direction. The through-openings DU1 with Dun are distributed about the outer perimeter of the storage body at a radial distance therefrom. In particular, they are off-set from one another by the same angle at circumference and comprise essentially the same radial distance to the center axis of the storage body SK. A stranding disk VS sits in a stationary manner at the output-side end of the storage body SK. The stranding disk VS is thereby put into rotation synchronously to the storage body SK. It may be expedient therein to accommodate the stranding disk VS in a stationary manner in a shell AH1. This shell AH1 is suspended in a rotating manner in a pivot bearing LA2, namely a slide bearing with a stationary bearing block. It is driven via a drive mechanism, in particular a motor MOV (together with a toothed belt, which is not illustrated in FIG. 6, that engages at the shell AH1, as well as an appertaining toothed belt disk).

For SZ-stranding of the optical waveguides LW1 with LWn, the stranding disk VS is expediently driven such that it changes its direction of rotation after a predeterminable number of rotations; that is, the storage body SK is driven in reverse. The storage body SK is thus put into rotation in an oscillating manner. In FIG. 6, the alternation of its direction of rotation between a clockwise rotation and a counterclockwise rotation (and vice versa) is indicated by a double-arrow of rotation RR.

The stranding disk VS comprises openings that penetrate all the way through in the longitudinal direction—that is to say, through boreholes DO0 with DOn. An individual optical waveguide LW1 with LWn is allocated to each through-opening DO1 with DOn. The through-openings DO1 with DOn are disposed all around the stranding axis VA. They are preferably offset relative to one another in the circumferential direction by the same angle at circumference and comprise the same radial distance to the central stranding axis VA. Because an optical waveguide such as KW1 is led through an individual through-opening such as DO1, a defined distribution is prescribed for the optical waveguides LW1 with LWn around the stranding axis VA, and an SZ-stranding is therefore effectuated in a controlled manner.

On the basis of the oscillating rotational movement of the storage body SK with the aid of the stranding disk VS that stands stationary at the output side, the optical waveguides LW1 with LWn which are drawn along parallel to the stranding axis are wound onto the storage body SK in the shape of a counter-clockwise spiral and a clockwise spiral in alternation. This is illustrated in FIG. 6 in that a respective spiral course is represented on the storage body SK for each of the two optical waveguides LW1, LWn. For the other optical waveguides LW2 with $LW_{n-1}$ which are not represented in the FIG. 1, a corresponding course derives.

The optical waveguides LW1 with LWn are drawn through the through-openings DO1 with DOn of the stranding disk VS and SZ-stranded together at the virtual stranding point VP of a subsequent stranding nipple VN. For the purpose of joining the optical waveguides LW1 with LWn, the stranding nipple VN preferably comprises a conically tapering through-opening whose inner diameter preferably corresponds to the outer diameter of the optical waveguide bundle being produced. To prevent a loosening of this strand union of optical waveguides, particularly in the region of its return points, it may be expedient to wind a retainer wrap HW around the optical waveguide strand union from the outside in the region of the virtual standing point VP. The retainer wrap winder which is required for this has been omitted from FIG. 6 for the sake of providing a better overview. The strand union, being held together as described, is subsequently grasped positively by a withdrawal mechanism AZV arranged downstream, namely a creeper-band withdrawal, and is transported forward continuously. The withdrawal mechanism SZ-simultaneously acts as a torsion block for the SZ-stranded optical waveguide strand union. The actual SZ-stranding is thus effectuated essentially by the withdrawal mechanism AZV acting as torsion block together with the rotating stranding disk VS. The optical waveguide strand union which has been so produced can potentially be embedded all around in filling compound with the aid of a subsequent filling device FV1. This optional filling device FV1 is represented in the FIG. 6 in dotted lines. Finally, following in series with the withdrawal mechanism AZV and the filling device FV1 (viewed in the withdrawal direction of the optical waveguide strand union), an extruder EX1 is arranged. With the aid thereof, the optical waveguide strand union, which may be embedded in filling compound, is finally surrounded by a plastic outer sheath. The optical transmission element OE4 that has been so produced is ultimately wound onto a downstream supply drum TR and thus made available for additional separate processing steps for cable production. It may also be expedient to feed the optical transmission element OE4 to processing apparatuses for producing an optical cable that are located downstream in the same production line, which are not illustrated here.

The extruder EX1 may also be omitted from the production line, and an outer sheath only installed onto the SZ-strand union later in a separate processing step, thereby forming the optical transmission element OE4.

The SZ-stranding device SZ is expediently driven such that the storage body SK changes its direction of rotation irregularly, in particular in a statistically distributed manner. As a result, the reversal points between clockwise and counterclockwise spirals of the optical waveguides in the strand union follow one another at irregular—that is, statistically varyied and non-equidistant—length intervals. FIG. 10 shows a schematic enlarged spatial view of the finished optical transmission element OE4. The optical waveguide LW1 has been removed from its outer sheath KH as a representative example of the remaining optical waveguides in the strand union. As viewed in the longitudinal direction of the optical transmission element OE4, the optical waveguide LW1 comprises a statistically varying number of twists in the respective direction of oscillation. As a result, sequences of different lengths of clockwise and counterclockwise spirals of the optical waveguide LW1 follow one another. Another result thereof is that the return points UK1 with Ukn between clockwise and counterclockwise spirals of the optical waveguide LW1 follow one another in a statistically distributed manner.

Preferably, the twist length for this type of SZ-stranding is varied between 80 and 500 mm. In particular, the statistical distribution of the return points for the SZ-stranding corresponds to a uniform distribution. Preferably between 5 and 20 revolutions of the respective optical waveguide are performed per twist direction (counter-clockwise or clockwise). The statistical distribution of the number of twists of the respective optical waveguide advantageously corresponds to a uniform distribution.

Because the torsion of the respective optical waveguide is statistically varied, local mechanical imperfections are likewise purposefully generated along its length. These imperfections are statistically distributed along the length of the respective optical waveguide. They effectuate additional dispersion-mode couplings for the transmission light in the interior of the optical waveguide; that is, an additional energy exchange between the dispersion-capable modes of the transmission light. This makes it possible to reduce transit time differences between the dispersion-capable modes of the transmission light; namely, to subsequently minimize the polarization-mode dispersion.

FIG. 7 shows a schematic of a possible production line HV2 for the optical transmission element OE1 shown in FIG. 1. From a stationary unwinding spool VTR1, the standard optical waveguide VT1 is pulled in a straight line into withdrawal mechanism Az. With the aid of a coating device GV, the optical waveguide LW is first covered evenly all around with a base color. With the aid of a subsequent jet device DU, microscopically small drops of dye FT are then delivered onto this still wet, unhardened base color GF at random consecutive time intervals. These color drops FT extend in the base color GF in the peripheral direction largely in the shape of rings and thus form ring marks RS1 with RSn. The dye applications RS1 with RSn are largely integrated into the base color GF. The dye applications RS1 with RSn thus follow one another at irregular—that is, statistically varying—intervals along the length of the optical waveguide LW. The optical waveguide that has been post-processed in this way is referenced LW* in FIG. 7. It may also be expedient to omit the coating device GV, so that the color applications RS1 with RSn are applied directly onto the outer coating of the optical waveguide LW. The optical waveguide LW* so post-processed is finally stored on a stationary supply drum VT2, where it is kept in stock for later processing in an optical transmission element or cable.

It may also be expedient, additionally to or independent of the statistically distributed material applications, to individually twist the respective optical waveguide. To accomplish this, the wind-up drum VT2 at the output side advantageously rotates about the orthogonal direction of withdrawal AZ and thus about the longitudinal axis of the optical waveguide LW, while the unwinding spool or drum VT1 remains stationary. The rotating motion of the wind-up drum VT2 is indicated by an arrow of rotation RP in FIG. 7. Since the rotation rate of the wind-up drum VT2 is statistically varied, the optical waveguide LW is self-apportioned in a statistically varying manner. This also enables the effectuation of additional dispersion-mode couplings at random and irregularly consecutive length intervals.

It may also be expedient to further process the post-processed optical waveguide LW* into an optical transmission element in the same production line. Expediently, for this purpose the optical waveguide LW* is surrounded by filling compound of a filling device FV2 which is illustrated in dotted lines. This filling device FV2 is followed in series by an extruder EX2, in order to surround the optical waveguide LW*, which has been thus embedded in filling compound, externally with the outer sheath KH. The optical transmission element OE1 of FIG. 1 is formed in this way. It can then be stored on the wind-up drum VT2.

FIG. 8 shows a schematic cross-section of an exemplary embodiment of an inventive optical cable OK1. In its center it comprises a tension resistant core element KE, namely an aramide fiber roving or a steel cable. The core element KE is preferably shaped approximately cylindrically from a spatial perspective. In the cross-section in FIG. 8, a plurality of optical transmission elements BA1 with BAn are wrapped around in strands along its outer perimeter. The respective optical transmission elements BA1 with BAn are preferably formed by a buffered fiber of conventional construction (the relevant dispersion-mode problems have not yet been dealt with). A buffered fiber such as the example BA1 comprises a plurality of optical waveguides such as LW11 with LW1n in its interior, which are embedded in filling compound FM. The outer sheath KH1 of the respective buffered fiber is preferably shaped like a cylinder. The strand union of the optical transmission elements BA1 with BAn that are wrapped around the core element KE can be fixed externally with the aid of a retainer wrap HW. It may also be expedient to fill the interspaces between the optical transmission elements BA1 with BAn with conventional cable filling compound KFM, in order to make the cable core assembly that is so produced longitudinally watertight. Lastly, an outer sheath AM of one or more layers is applied about this cable core assembly externally, as is customary in communication cable technology.

The optical transmission elements BA1 with BAn are advantageously stranded about the core element KE, namely with a statistically varying twist length. This can advantageously be accomplished with the aid of the SZ-stranding device SZ of FIG. 6. There, the core element KE is then additionally withdrawn from a supply reel VSK (illustrated in dotted lines) and pulled through the interior of the storage body SK orthogonally in the longitudinal direction AR. The core element KE emerges from the storage body SK at the output side from the central through-opening of the stranding disk VS. In the subsequent stranding nipple VN, instead of the optical waveguides LW1 with LWn, the optical transmission elements BA1 with BAn are now wound around the core element KE.

Because the number of twists per oscillation direction is statistically varied, and the return points between the two twist directions follow one another at statistically distributed, irregular and non-equidistant length intervals as viewed along the length of the cable OK1, it is likewise possible to effectuate additional dispersion-mode couplings in the optical waveguides of the optical transmission elements BA1 with Ban. In this way, even the polarization-mode dispersion of optical waveguides in optical transmission elements of standard production, such as conventional fiber-optic loose tubes or buffered fibers, can be subsequently reduced.

It is potentially also possible to strand the optical transmission elements BA1 with BAn around the core element KE in Lang's lay and to statistically vary the twist length thereof for the purpose of reducing dispersion. In this way, also, it is already possible to produce local imperfections in the optical waveguides of each optical transmission element BA1 with Ban.

Figure 9:
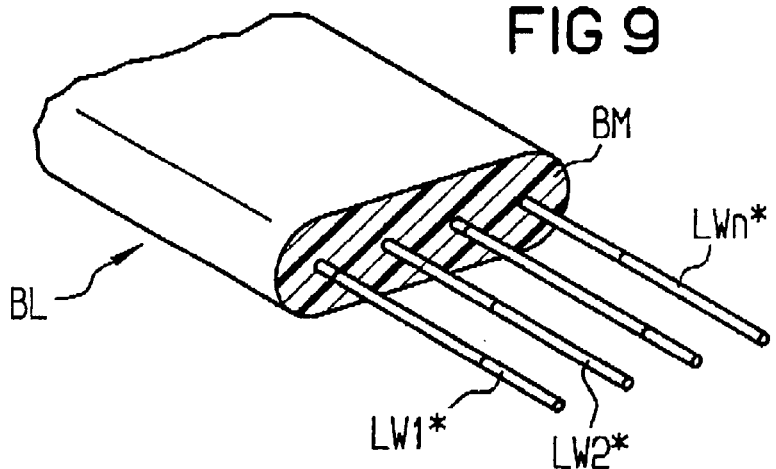
FIG. 9 is a partial schematic enlarged perspective view of an optical waveguide strip as another exemplary embodiment of an optical transmission element according to the invention comprising the inventively post-processed optical waveguides.

FIG. 9 shows an enlarged schematic perspective view of an optical waveguide strip BL as another exemplary embodiment of an inventive optical transmission element. In cross-section, the optical waveguide strip comprises a rectangular jacket BM. This sheath BM is preferably produced by extrusion of plastic materials such as DSM 706. A plurality of optical waveguides LW1* and LWn* are embedded in the plastic material of the strip's sheath. These optical waveguides LW1* and LWn* are situated in a common plane largely parallel and adjacent one another. They extend essentially orthogonally along the length of the optical waveguide strip BL. The optical waveguides LW1 with LWn are preferably disposed at approximately equidistant transverse intervals from one another in their common lay plane. Furthermore, this lay of approximately parallel optical waveguides situated next to one another at transverse intervals can also potentially be coated with resins, in particular acryl resins, all around to form an approximately rectangular sheath. The optical waveguides LW1* and LWn* are each advantageously constructed corresponding to the optical waveguide LW* of FIG. 1; that is, on each optical waveguide additional material applications have been subsequently applied in a statistically distributed manner, in order to inventively raise the number of dispersion-mode couplings originally present in the respective optical waveguide interior.

Of course, additional dispersion-mode couplings can also be subsequently generated in the optical waveguides thereof by torsion of the optical waveguide strip with statistically varying twist lengths. Disturbing particles may also be layered into the sheath material BM of the strip in a statistically distributed manner, which particles trigger mechanical imperfections, particularly microbends, in the optical waveguide.

As a whole, the post-processing methods that are shown for the transmission elements of FIGS. 1 with 10 for reducing the polarization-mode dispersion of the optical waveguides in the optical transmission elements OE1 with OE4 that are shown there may be advantageously transferred to any other optical transmission elements.

Figure 11:
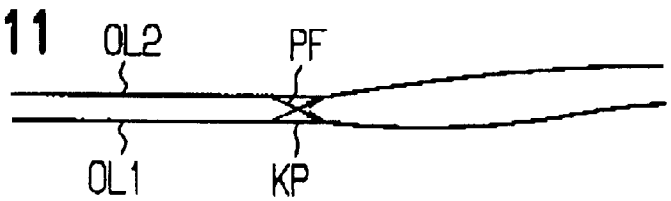
FIG. 11 is a schematic of the polarization-mode coupling that is effectuated by a mechanical imperfection, for two fictive optical paths.

Lastly, FIG. 11 shows a schematic of the coupling principle between two virtual optical paths OL1 with OL2 in an optical waveguide. It is assumed that the transmission light moves faster along the optical path OL2 than along optical path OL1. Now, a mechanical fault can give rise to a local coupling point KP at which a coupling-over of light between the two paths OL1 with OL2 can be generated. The optical coupling-over is indicated by arrows PF. By the energy exchange between the two optical paths at the coupling point KP, an equalization can be effectuated of the optical transit times and transit lengths for the different dispersion-capable modes of the transmission light.

The measures that are detailed with the aid of the FIGS. 1 with 11 for the subsequent additional providing of dispersion-mode couplings for the respective optical waveguide can be employed either individually or in random combination with one another.

Expediently, the respective optical waveguide is postprocessed from as many imperfections along its transmission length as will effectuate at least 0.0001%, and in particular between 0.01 and 1%, more dispersion-mode couplings than in the originally given optical waveguide.

We claim:

1. An optical transmission element, comprising:
    an optical waveguide having a given polarization-mode dispersion;
    at least one outer protective layer applied to and completely surrounding said optical waveguide; and
    a plurality of imperfections, for reducing the given polarization-mode dispersion, formed by additional material applications applied on an outer surface of said outer protective layer and distributed at irregular intervals along a length of said optical waveguide for purposefully effecting additional polarization-mode couplings for transmission light in an interior of said optical waveguide.

2. The optical transmission element according to claim 1, wherein said material applications are color markings.

3. The optical transmission element according to claim 1, which comprises an elongated winding material wrapped around said optical waveguide, said winding material forming a disturbing mechanism for effecting additional imperfections and thus additional dispersion-mode couplings in said optical waveguide.

4. The optical transmission element according to claim 1, wherein said optical waveguide is twisted with an irregularly varying twist length for effecting additional imperfections.

5. The optical transmission element according to claim 1, wherein said optical waveguide is stranded with an irregularly varying twist length for effecting additional imperfections.

6. The optical transmission element according to claim 1, which comprises an outer sheath forming a tube surrounding said optical waveguide.

7. The optical transmission element according to claim 1, wherein said optical waveguide is one of a plurality of waveguides.

8. The optical transmission element according to claim 7, which comprises an outer sheath forming a tube surrounding said plurality of optical waveguides.

9. The optical transmission element according to claim 1, wherein said optical waveguide is a monomode fiber.

10. The optical transmission element according to claim 1, wherein said optical waveguide is post-processed with a number of imperfections guaranteeing at least 0.001 more dispersion-mode couplings than said optical waveguide substantially without imperfections.

11. The optical transmission element according to claim 1, wherein said optical waveguide is post-processed with a number of imperfections guaranteeing between 0.01 and 1% more dispersion-mode couplings than said optical waveguide substantially without imperfections.

12. In combination with an optical cable, at least one optical transmission element according to claim 1.

13. An optical transmission element, comprising:
    an optical waveguide having a given polarization-mode dispersion;
    at least one outer protective layer applied to and completely surrounding said optical waveguide; and
    filling compound embedding said optical waveguide, said filling compound containing particles distributed along said optical waveguide at irregular intervals and forming imperfections along said optical waveguide for reducing the given polarization-mode dispersion, for purposefully effecting additional polarization-mode couplings for transmission light in an interior of said optical waveguide.

14. The optical transmission element according to claim 13, which comprises an elongated winding material wrapped around said optical waveguide, said winding material forming a disturbing mechanism for effecting additional imperfections and thus additional dispersion-mode couplings in said optical waveguide.

15. The optical transmission element according to claim 13, wherein said optical waveguide is twisted with an irregularly varying twist length for effecting additional imperfections.

16. The optical transmission element according to claim 13, wherein said optical waveguide is stranded with an irregularly varying twist length for effecting additional imperfections.

17. The optical transmission element according to claim 13, which comprises an outer sheath forming a tube surrounding said optical waveguide.

18. The optical transmission element according to claim 13, wherein said optical waveguide is one of a plurality of waveguides.

19. The optical transmission element according to claim 18, which comprises an outer sheath forming a tube surrounding said plurality of optical waveguides.

20. The optical transmission element according to claim 13, wherein said optical waveguide is a monomode fiber.

21. The optical transmission element according to claim 13, wherein said optical waveguide is post-processed with a number of imperfections guaranteeing at least 0.001% more dispersion-mode couplings than said optical waveguide without imperfections.

22. The optical transmission element according to claim 13, wherein said optical waveguide is post-processed with a number of imperfections guaranteeing between 0.01 and 1% more dispersion-mode couplings than said optical waveguide substantially without imperfections.

23. In combination with an optical cable, at least one optical transmission element according to claim 13.

24. A method of reducing a polarization-mode dispersion of an optical waveguide, which comprises:
providing an optical waveguide having a given polarization-mode dispersion;
reducing the polarization-mode dispersion by forming disturbances along a length from the outside and distributed at irregular length intervals, and thereby producing additional polarization-mode couplings for transmission light in an interior of the optical waveguide, wherein the disturbances are effected by additional material applications on an outer protective layer of the optical waveguide.

25. A method of reducing a polarization-mode dispersion of an optical waveguide, which comprises:
providing an optical waveguide having a given polarization-mode dispersion;
embedding the optical waveguide in a filling compound, and introducing particles into the filling compound forming disturbances along a length of the optical waveguide from outside and distributed at irregular length intervals for the purpose of reducing the given polarization-mode dispersion of the optical waveguide by producing additional polarization-mode couplings for transmission light in an interior of the optical waveguide.

* * * * *

UNITED STATES PATENT AND TRADEMARK OFFICE
CERTIFICATE OF CORRECTION

PATENT NO.   : 6,278,828 B1
DATED        : August 21, 2001
INVENTOR(S)  : Waldemar Stöcklein et al.

It is certified that error appears in the above-identified patent and that said Letters Patent is hereby corrected as shown below:

<u>Title page,</u>
Item [63], should read as follows:
Continuation of PCT/DE98/03735, December 18, 1998.

Item [56], should also include the following:

| | | | |
|---|---|---|---|
| United States Patent Number | 3,687,514 | 8/1972 | Miller et al. |
| European Patent Application | EP 0 582 405 | 2/1994 | Hart et al. |
| European Patent Application | EP 0 646 819 | 4/1995 | Bergano et al. |
| Japanese Patent Abstract | JP 58 130 129 | 8/1983 | Shibata |
| Japanese Patent Abstract | JP 08 043 694 | 2/1996 | Ohashi |
| International Publication | WO 96/23739 | 8/1996 | Geertman |

<u>Column 16,</u>
Line 35, at least "0.001" should read: -- Column 16, Claim 10, line 35, at least "0.001% --.

Signed and Sealed this

Second Day of July, 2002

*Attest:*

*Attesting Officer*

JAMES E. ROGAN
*Director of the United States Patent and Trademark Office*